(12) United States Patent
Nanchung et al.

(10) Patent No.: US 12,172,132 B2
(45) Date of Patent: Dec. 24, 2024

(54) DEFECT DETECTION VIA GAS TRANSFER (71) Applicant: ELECTRIC HYDROGEN CO., Natick, MA (US)

(72) Inventors: Tenzin Nanchung, Somerville, MA (US); Danielle Gobron, Arlington, MA (US); Dinesh Sabarirajan, Medford, MA (US)

(73) Assignee: Electric Hydrogen Co., Natick, MA (US)

( * ) Notice: Subject to any disclaimer, the term of this patent is extended or adjusted under 35 U.S.C. 154(b) by 0 days.

(21) Appl. No.: 18/683,752

(22) PCT Filed: Dec. 20, 2022

(86) PCT No.: PCT/US2022/053518
§ 371 (c)(1),
(2) Date: Feb. 14, 2024

(87) PCT Pub. No.: WO2023/129430
PCT Pub. Date: Jul. 6, 2023

(65) Prior Publication Data
US 2024/0261735 A1    Aug. 8, 2024

Related U.S. Application Data

(60) Provisional application No. 63/293,932, filed on Dec. 27, 2021.

(51) Int. Cl.
*B01D 65/10* (2006.01)
*C25B 15/00* (2006.01)

(52) U.S. Cl.
CPC .......... *B01D 65/102* (2013.01); *C25B 15/00* (2013.01)

(58) Field of Classification Search
CPC .............................. B01D 65/102; C25B 15/00
(Continued)

(56) References Cited

U.S. PATENT DOCUMENTS 6,156,447 A     12/2000  Bette et al.
9,653,743 B2 *   5/2017  Ahn .................. H01M 8/04671
(Continued)

FOREIGN PATENT DOCUMENTS

JP         2005071819 A   *   3/2005
KR       101427976 B1   *   8/2014
(Continued)

OTHER PUBLICATIONS

Williams et al., "Robotic arm for automated assembly of proton exchange membrane fuel cell stacks", Journal of Fuel Cell Science and Technology 11.5(Oct. 1, 2014), pp. 1-5 (Year: 2014).*
(Continued)

*Primary Examiner* — Marrit Eyassu
(74) *Attorney, Agent, or Firm* — Lempia Summerfield Katz LLC (57) ABSTRACT

A system may detect defects in a membrane cell or portion thereof by detecting gas transfer across the defect. Gas may be released in a release region of a chamber. The release region may be separated from a detection region of the chamber by the membrane cell or portion thereof. When gas traverses the product from the release region to the detection region, the system may determine that the membrane cell or portion thereof has a defect.

17 Claims, 7 Drawing Sheets

(58) Field of Classification Search
USPC .............................................. 73/40
See application file for complete search history.

(56) References Cited

U.S. PATENT DOCUMENTS

| | | | |
|---|---|---|---|
| 2005/0126264 A1* | 6/2005 | Komninos | G01M 3/24 |
| | | | 73/40.5 A |
| 2011/0001500 A1* | 1/2011 | Uchiyama | G01N 27/302 |
| | | | 324/705 |
| 2017/0335476 A1 | 11/2017 | Hanebuth et al. | |
| 2021/0131902 A1 | 5/2021 | Jourdan | |
| 2021/0178332 A1* | 6/2021 | Hong | G01N 13/04 |

FOREIGN PATENT DOCUMENTS

| | | | | |
|---|---|---|---|---|
| WO | WO-2018180095 A1 * | 10/2018 | | B01D 53/228 |
| WO | WO-2021177125 A1 * | 9/2021 | | G01N 23/2204 |

OTHER PUBLICATIONS

Written Opinion of the International Searching Authority for PCT/US2022/053518, mailed May 12, 2023, pp. 1-9.
Williams et al., "Robotic arm for automated assembly of proton exchange membrane fuel cell stacks," Journal of Fuel Cell Science and Technology 11.5 (Oct. 1, 2014), pp. 1-5.
Bilgera et al., "Application of convolutional long short-term memory neural networks to signals collected from a sensor network for autonomous gas source localization in outdoor environments," Sensors 18.12 (Dec. 18, 2018), pp. 1-12.

* cited by examiner

DEFECT DETECTION VIA GAS TRANSFER

PRIORITY

This application is a § 371 nationalization of PCT Application Serial No. PCT/US2022/053518, filed Dec. 20, 2022, designating the United States, which claims priority to U.S. Provisional Application No. 63/293,932, filed Dec. 27, 2021, and titled DEFECT DETECTION VIA GAS TRANSFER, which are incorporated by reference herein in their entireties.

FIELD

The following disclosure relates to detecting defects based on gas transfer.

BACKGROUND

Electrolyzer systems use electrical energy to drive a chemical reaction. For example, water is split to form hydrogen and oxygen. The products may be used as chemical feedstocks and/or energy sources. In recent years, improvements in operational efficiency have made electrolyzer systems competitive market solutions for energy storage, generation, and/or transport. For example, the cost of generation may be below $10 per kilogram of hydrogen in some cases. Decreases in cost, increases in efficiency, and/or improvements in operation will continue to drive installation of electrolyzer systems.

BRIEF DESCRIPTION OF THE DRAWINGS

Example implementations are described herein with reference to the following drawings.

DETAILED DESCRIPTION

The discussed architectures and techniques may support detection of defects in various products. In some cases, defects may be detected in membranes including those used in proton exchange membrane water electrolysis (PEMWE).

In some cases, it may be desirable to determine whether a particular product includes defects, such as pinholes, cracks, fissures, and/or other defects. Products may include membranes for PEMWE, other membranes, membrane electrode assemblies, PEMWE cells, PEMWE stacks, and/or other products. In various implementations, the product may partition a chamber into a detection region and a (gas) release region. Gas may be released in the chamber on the release region. When gas is detected on the other region of the chamber, it can be determined that the gas traversed the product via a defect. In some cases, multiple gas sniffers may be set at known positions to determine an approximate position of the defect (e.g., by determining which sniffer(s) have the strongest signal; determining the order in which the sniffer(s) detected the gas; triangulation based on signal strength; or other position determination method. In various implementations, helium gas may be used along with helium gas sniffers. However, other gases and other sniffer types may be used.

Various product may have some level of gas permeability even in the absence of defects. Accordingly, threshold detection levels may be used in lieu of (or in addition to) absolute detection levels for the determination of leaks. In some cases, lower permeability levels for a product may support lower defect detection thresholds.

Figure 1:
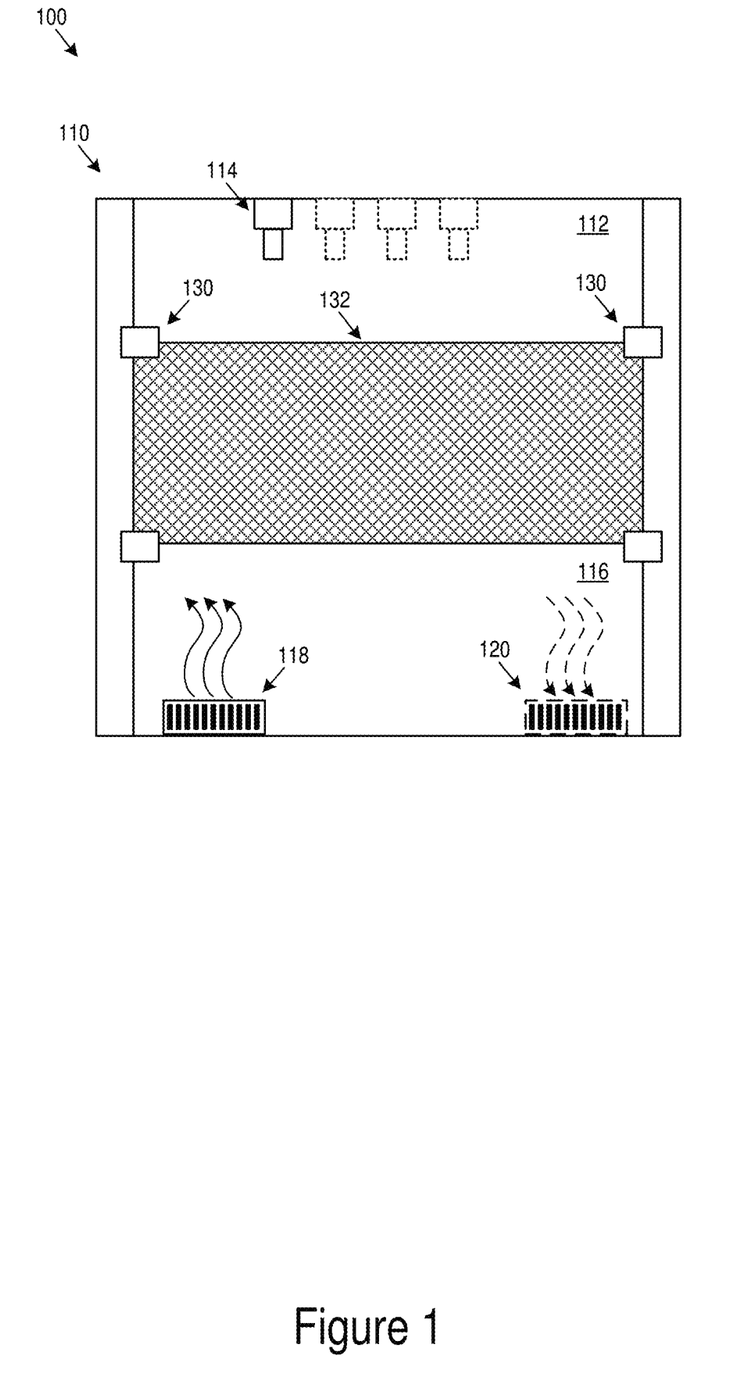
FIG. 1 shows an example defect detection system.

FIG. 1 shows an example defect detection system (DDS) 100. The example DDS 100 may include a chamber 110 with two regions 112, 116. In the detection region 112, the chamber may include a gas sniffer 114 (or multiple gas sniffers). In the release region 116, the chamber may include a gas supply port 118 to supply gas for detection of the defects. In some cases, the release region 116 may also include a gas removal port 120 to support cycling of gas in the release region 116. The chamber 110 may further include a product holder 130 to hold the product 132 such that the product partitions the chamber into the detection 112 and release 116 regions.

Although the detection region 112 is shown as being above the release region 116 in the example DDS, other configurations may be used. In an illustrative example using xenon, in an ambient air environment, xenon may tend to fall due to settling having no heavier gases present to force the xenon upward. Accordingly, the detection region 112 may be placed below the release region 116. Other configurations such as side-by-side may be used.

In some cases, differential pressure may be used. For example, the detection region may be held at vacuum (or lower pressure than the release region) to pull gas through any existing defects. However, the pressure differentials (if used) may be selected to avoid damaging the product.

Figure 2:
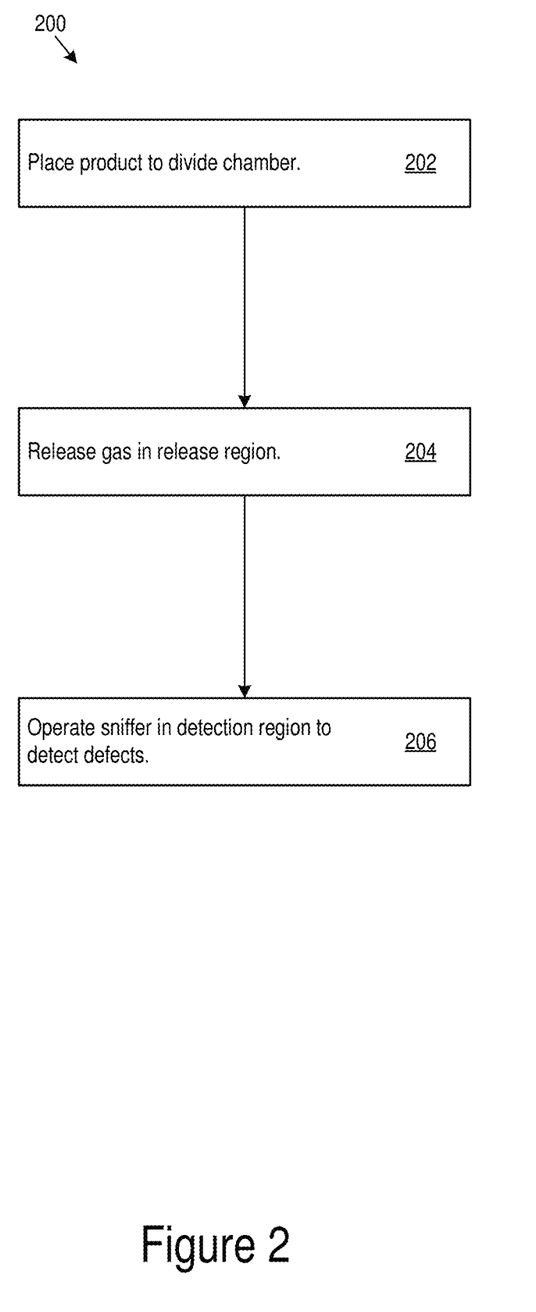
FIG. 2 shows an example method for the detection of defects.

Referring now to FIG. 2 while continuing to refer to FIG. 1, FIG. 2 shows an example method 200 for the detection of defects. A product 132 may be placed to divide a chamber 110 into detection 112 and release 116 regions (202). The product 132 may include electrolysis membranes, membrane electrode assemblies, membrane cell assemblies, and/or a stack including multiple membrane cells. The membrane, electrodes, cells, and/or stacks may be products for electrolysis. For example, the products may be components for PEMWE systems.

The product 132 may be held via various different holders 130 that may be specific to the type of product 132 being tested. For example, continuous feed holders may be used with membrane materials, e.g., before the material is partitioned for use in individual cells.

Additionally or alternatively, piecewise feeds may be used for assemblies, individual membranes (e.g., partitioned membranes, or other individual membranes), or other quantized products. Rollers and/or robotic arms may be used for positioning items for test. Clamps (e.g., automated clamps) may be used to hold pieces in place during testing. Clamps may be later released when testing is complete to allow the product to be moved and replaced with a new product for testing. Conveyors may be used to move products from, for example, an assembly location to the testing chamber. Similarly conveyors may be used to move products from the testing chamber to areas for further assembly and/or product packaging. Thus, testing may be automated and may be implemented as a pre-assembly and/or post-assembly quality checking system for a product manufacturing system.

While the product 132 is held with dividing the chamber, gas may be released in the release region 116 (204). The gas may be released from the gas supply port 118. In some cases, the gas may be cycled. For example, to maintain a static mix of gas, to prevent gas settling (e.g., separation of different gas types), and/or to maintain other gas properties. The gas may be cycled through the supply 118 and removal 120 ports.

In some implementations, helium gas may be used. Various commercially available gas sniffers are calibrated for helium detection. Helium has high permeability in many materials and may traverse various defects. Helium's low interactivity may ensure that the helium is less likely to be trapped in the product rather than traversing a defect which may increase the sensitivity of the system to defects. Low interactivity may also help to ensure that the testing process does not contribute to product 132 degradation. Helium is also unlikely to be present (e.g., in free or chemical form) within the materials of the product. Thus, detection of helium during testing is an indication that the helium from the release region 112 is reaching the detection region 112.

In various implementations, other gas types may be used. For example, as discussed above, a heavier gas such as xenon may be used. Additionally or alternatively as discussed below, gases such as nitrogen and/or argon may be used. For example, a gas other than helium may be used in an implementation in which the product 132 includes helium for an alternative purpose.

The release of gas in the release region may be set to maintain a pressure differential between the release 116 and detection 112 regions. For example, pressure in the two regions may be monitored, and the rate of release of gas in the release region 116 may be adjusted to maintain the differential. In various implementations, a feedback-loop-type control circuit may be used to control the gas release. Other control systems may be used.

A gas sniffer 114 may be operated in the detection region to determine whether gas has leaked into the detection region via a defect present in the product (206). In various implementations, a single sniffer and/or multiple sniffers in concert may be used to provide a binary (e.g., yes/no) indication of whether the released gas is detected.

In various implementations, multiple sniffers 114 may be used to determine an approximate location of the defect. For example, an array of sniffers 114 at known locations may be used to determine an approximate location. For example, the defect may be assumed to be at the location of the sniffer 114 detecting the strongest signal. For example, triangulation may be used to determine an approximate location of the defect when multiple sniffers 114 detect gas. Sampling by the sniffers 114 may be used to provide input data for gas cloud modeling. The modeled gas cloud may be used to determine a shape/size/position of the defect.

In some implementations, multiple stages of detection may be used. For example, during a first stage, a binary gas detection scheme may be used. If no gas is detected, the product 132 may be advanced since no defects were detected. If gas is detected, a second stage of gas detection may be used to better characterize the location, size, and/or shape of defect. Because shape/size/position characterization may take more information than binary detection, a larger data sample may be needed. Collecting a data sample may take time. In cases where it can be quickly ascertained that a defect does not exist, the system may be able to operate faster by not attempting to generate a detailed characterization of a non-existent defect.

In various implementations, the sniffer 114 may be calibrated to register detection when a threshold level of gas is detected. For example, the threshold level of gas may be selected based on a level of gas that is expected to permeate the product 132 in the absence of defects. For example, a PEMWE membrane may be expected to be semi-permeable to helium even when free of defects. Nevertheless, the presence of a pinhole, fissure, thinned region, or other defect may result in a greater level of permeation through the PEMWE membrane. The threshold may be dependent on the type of product. For example, a membrane may be expected to me more permeable than a membrane electrode assembly, which in turn may be expected to be more permeable than a membrane cell assembly, which may in turn be expected to be more permeable than a stack assembly of multiple cell membranes.

Figure 3:
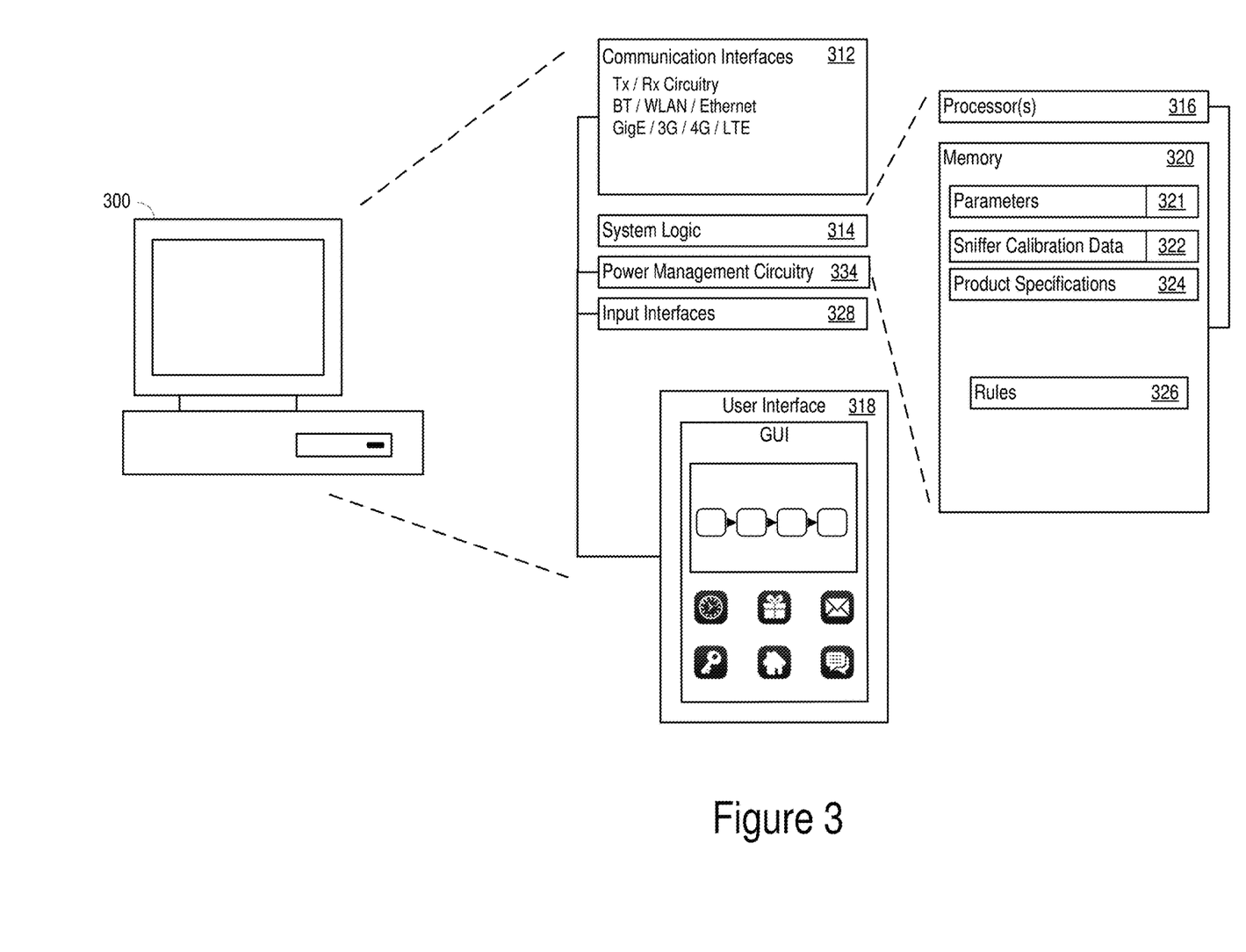
FIG. 3 shows an example execution environment.

FIG. 3 shows an example execution environment (EE) 300 which may be used for control, processing, and/or management of the defect detection system (e.g., the DDS 100 or other DDS). The EE 300 may include system logic 314 to support gas level maintenance, product flow control, location approximation, gas cloud modeling, and/or other operations such as those discussed below with respect to the various example implementations. The system logic 314 may include processors 316, memory 320, and/or other circuitry.

The memory 320 may be used to store sniffer calibration data 322 and/or product specifications 324 used or other data. The memory 320 may further store parameters 321, such as gas level reference data, modeling data, flow control data, and/or other parameters that may facilitate product flow, chamber operation, and/or defect approximation. The memory may further store rules 326, which may support product flow, chamber operation, and/or defect approximation.

The memory 320 may further include applications and structures, for example, coded objects, templates, or one or more other data structures to support product flow, chamber operation, and/or defect approximation. The EE 300 may also include one or more communication interfaces 312, which may support wireless, e.g. Bluetooth, Wi-Fi, WLAN, cellular (3G, 4G, LTE/A), and/or wired, ethernet, Gigabit ethernet, optical networking protocols. Additionally, or alternatively, the communication interface 312 may support secure information exchanges, such as secure socket layer (SSL) or public-key encryption-based protocols for sending and receiving data. The EE 300 may include power management circuitry 334 and one or more input interfaces 328.

The EE 300 may also include a user interface 318 that may include man-machine interfaces and/or graphical user interfaces (GUI). The GUI may be used to present prompts for user input to control product flow, chamber operation, and/or defect approximation, and/or other user input.

Example Implementations

Various illustrative example implementations are discussed below. The illustrative example implementations are illustrative of the general architectures and techniques described above and in the claims below. Designations of particular features such as "key", "critical", "important", "must", and/or other similar designations are included to clarify the relationship of that particular feature to the specific illustrative scenario/scenarios in which the particular feature is discussed. Such a relationship to the same degree may not apply without express description of such a relationship to other implementations. Nevertheless, such features described with respect to the individual example implementations may be readily integrated with other implementations with or without various other features present in the respective example implementation.

An illustrative example system allows for the detection of defects like pinholes, from component levels to final cell and stack assembly, to reduce defects during stack manufacturing. In the illustrative example system, a combination of He, argon (Ar), nitrogen ($N_2$) gas is used for performing pin-hole tests at various stages of manufacturing of the stack cells. This technique to check for pinholes may not only be used for membranes but also for catalyst coated membranes and cells as well since defects may be introduced at every step in manufacturing.

Separators/membranes used for electrolysis are getting thinner. It can be a challenge to isolate defects and qualify products being used for mass manufacturing.

The illustrative example systems discussed below use helium gas to detect pinholes or virtually any other defect allowing gas transport. Pinholes can be detected using a step by step process can help determine the process parameter that causes the defect and the defect location. In an illustrative implementation, the gas detectors/sniffers may be calibrated to detect a threshold acceptable value to account for helium permeation levels through different components in the cell. The sniffers grade the products such as membrane, catalyst coated membranes, membrane electrode assembly, individual cells and stack assembly based on a pass/fail criteria set based on permeability of helium in the various products. Nitrogen and/or argon (or other noble gases) may be used as alternatives to helium. Various implementations may use inert detection gases (possibly with other inert gases forming the environment) to avoid degradation of catalyst components.

Analyzing individual components may prevent components with defects from being included in more complex assemblies. This may reduce time dedicated to stack builds and/or rebuilds. Once the stack has been assembled, a leak check and/or a pressure drop over time can be used as final quality check.

Figure 4:
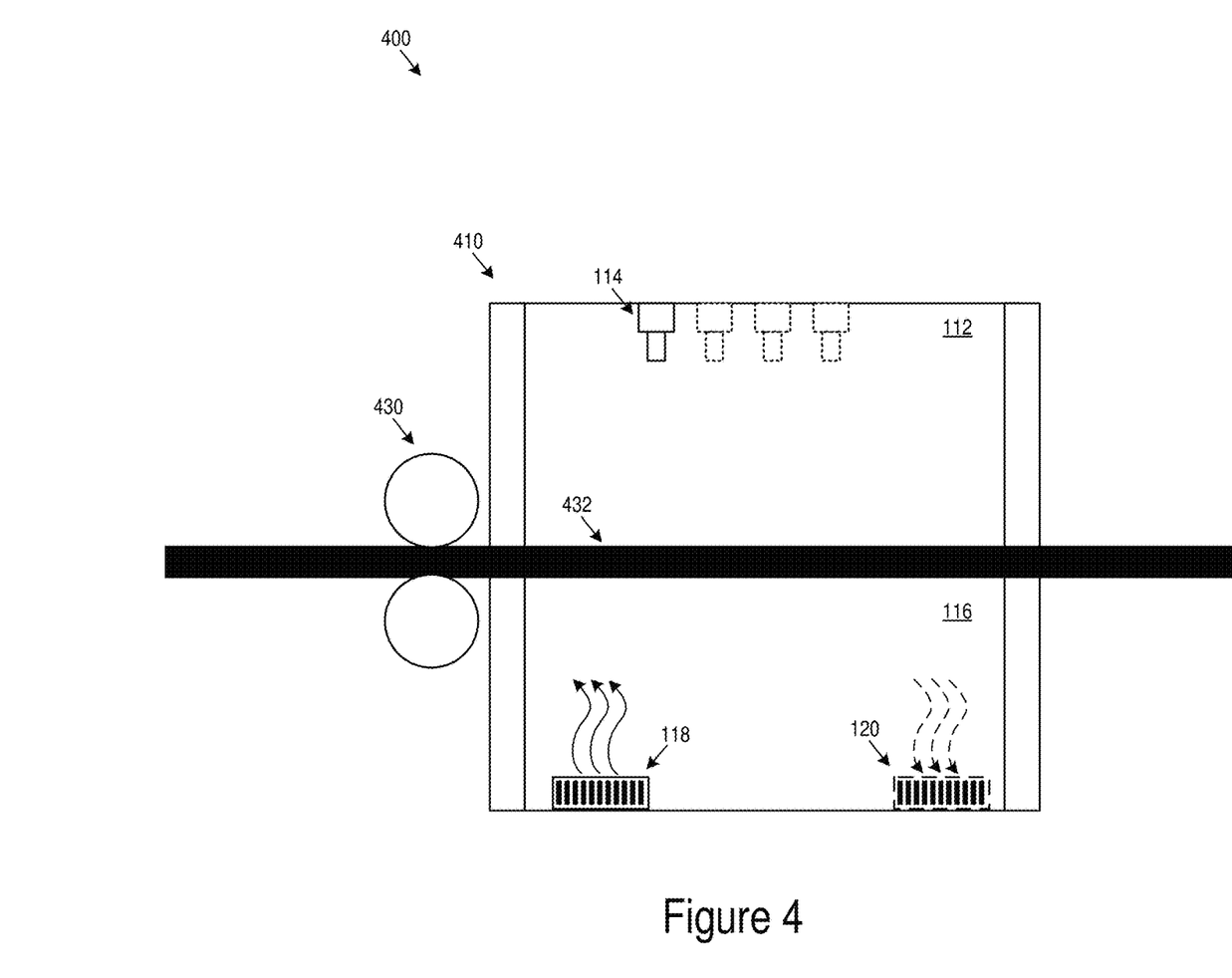
FIG. 4 shows an illustrative example membrane defect detection system for detecting defects in a membrane.

FIG. 4 shows an illustrative example membrane DDS 400 including a chamber 410 for detecting defects in a membrane 432, such as a PEMWE membrane. The illustrative example membrane DDS 400 may include a roll feed 430. The roll feed may feed the membrane 432 as a continuous sheet (as shown) or be used to feed partitioned membranes (e.g., on a conveyor system or other actuator system compatible with the membrane DDS 400 (not shown)).

Figure 5:
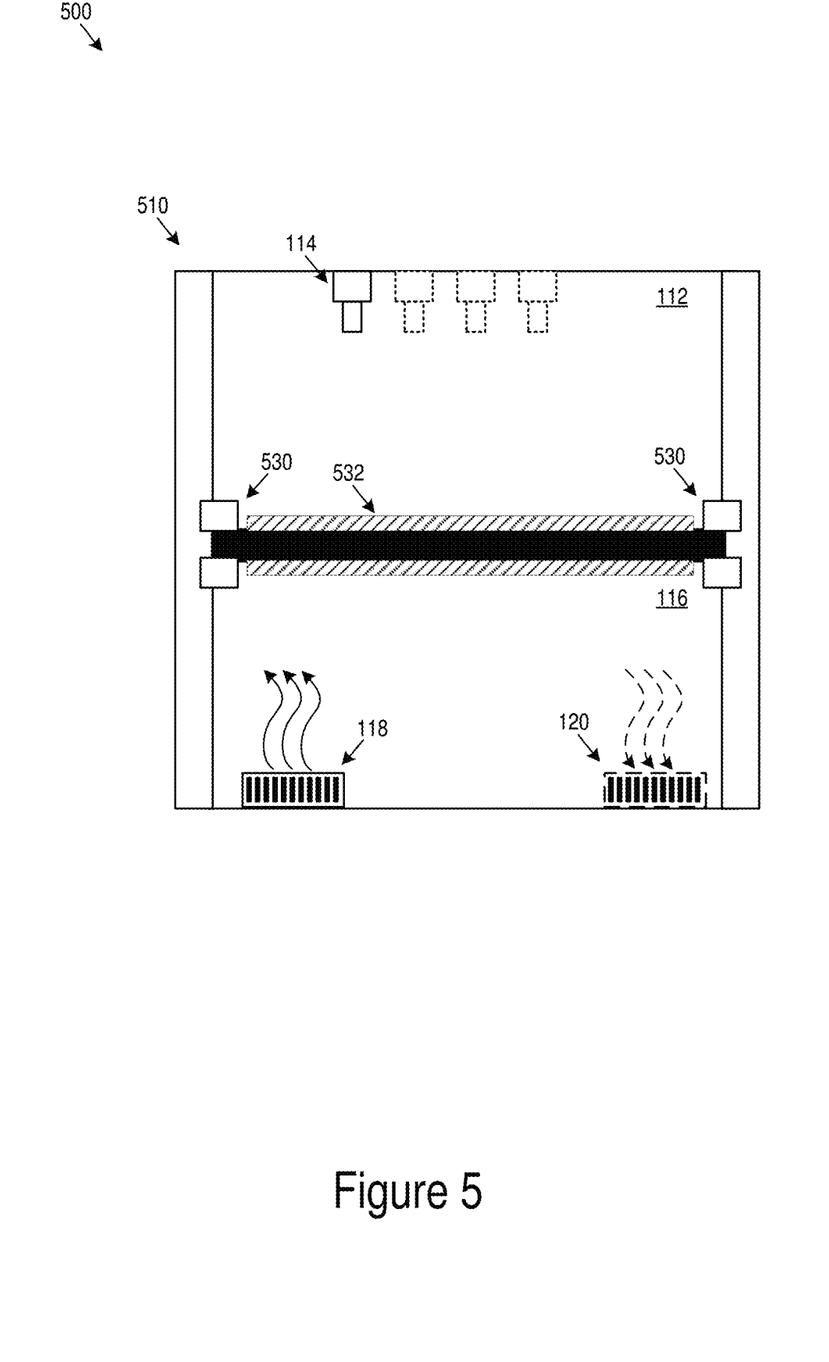
FIG. 5 shows an illustrative example electrode defect detection system for detecting defects in a membrane electrode assembly.

FIG. 5 shows an illustrative example electrode DDS 500 for detecting defects in a membrane electrode assembly 532. The electrode DDS 500 may be configured to operate in a piecewise fashion. The individual membrane electrode assemblies may be loaded into the electrode DDS 500 piecewise, e.g., via a robotic arm or other actuator system (not shown). Clamps 530 may hold the membrane electrode assembly 532 in place during operation of the electrode DDS 500 and may form seals to maintain gas pressure/isolation in the chamber 510.

Figure 6:
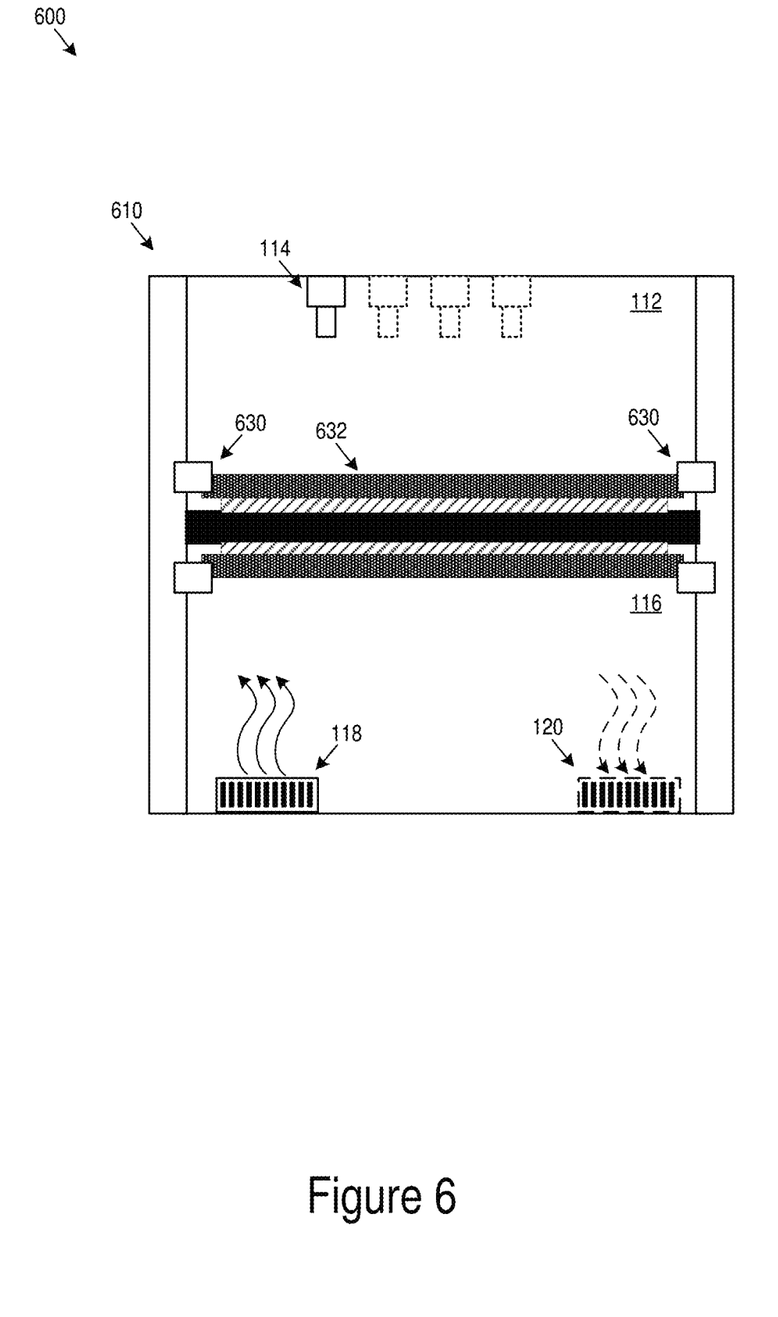
FIG. 6 shows an illustrative example cell defect detection system for detecting defects in a membrane cell assembly

FIG. 6 shows an illustrative example cell DDS 600 for detecting defects in a membrane cell assembly 632. The cell DDS 600 may be configured to operate in a piecewise fashion. The individual membrane cell assemblies may be loaded into the cell DDS 600 piecewise, e.g., via a robotic arm or other actuator system (not shown). Clamps 630 may hold the membrane cell assembly 632 in place during operation of the cell DDS 600 and may form seals to maintain gas pressure/isolation in the chamber 610.

Figure 7:
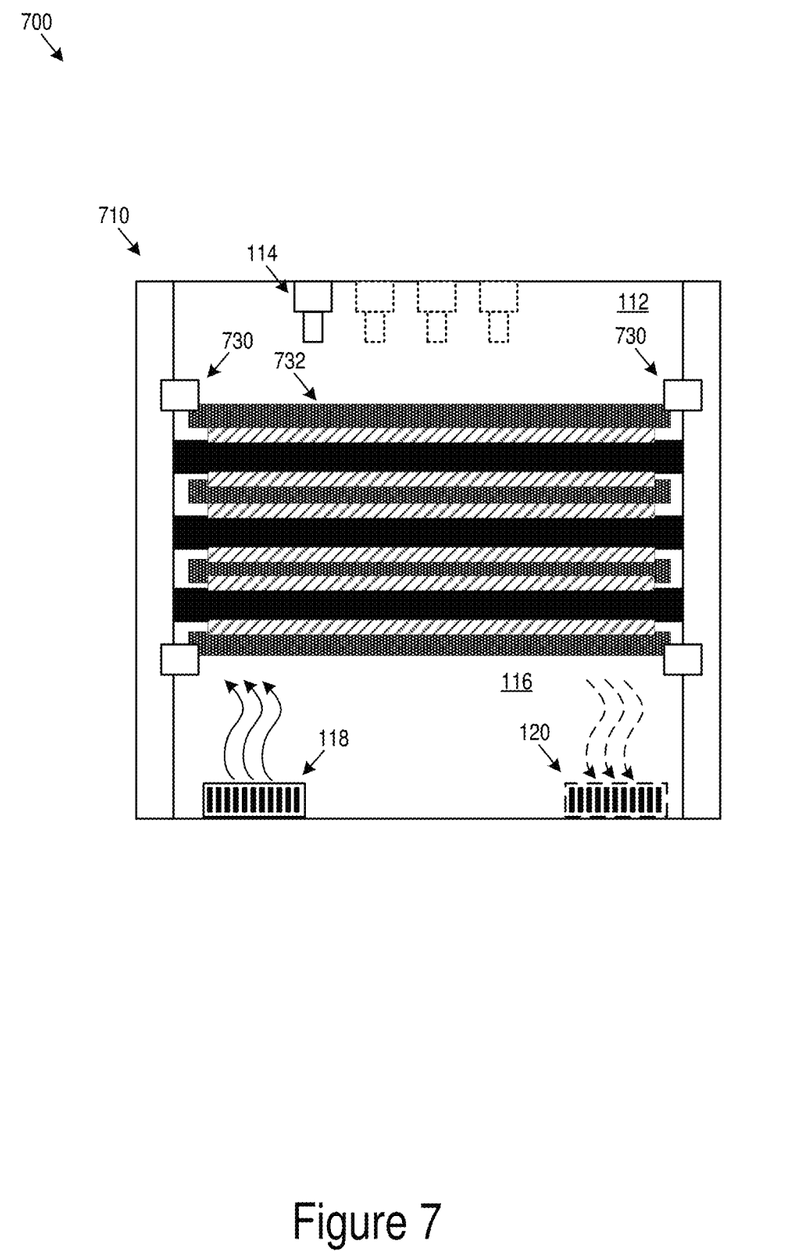
FIG. 7 shows an illustrative example stack defect detection system for detecting defects in a stack assembly.

FIG. 7 shows an illustrative example stack DDS 700 for detecting defects in a stack assembly 732. The stack DDS 700 may be configured to operate in a piecewise fashion. The individual membrane stack assemblies may be loaded into the stack DDS 700 piecewise, e.g., via a robotic arm or other actuator system (not shown). Clamps 730 may hold the membrane stack assembly 732 in place during operation of the stack DDS 700 and may form seals to maintain gas pressure/isolation in the chamber 710.

One or more implementations of the disclosure may be referred to herein, individually and/or collectively, by the term "invention" merely for convenience and without intending to voluntarily limit the scope of this application to any particular invention or inventive concept. Moreover, although specific implementations have been illustrated and described herein, it should be appreciated that any subsequent arrangement designed to achieve the same or similar purpose may be substituted for the specific implementations shown. This disclosure is intended to cover any and all subsequent adaptations or variations of various implementations. Combinations of the above implementations, and other implementations not specifically described herein, are apparent to those of skill in the art upon reviewing the description.

As used herein, the singular forms "a," "an," and "the" include plural referents unless the context clearly dictates otherwise.

As used herein, "for example," "for instance," "such as," or "including" are meant to introduce examples that further clarify more general subject matter. Unless otherwise expressly indicated, such examples are provided only as an aid for understanding implementations illustrated in the present disclosure and are not meant to be limiting in any fashion. Nor do these phrases indicate any kind of preference for the disclosed implementations. Table 1 includes various examples.

TABLE 1

Examples

1. A system including:
a chamber with a release region and a detection region;
a membrane holder positioned to hold a membrane to separate the release region and detection region;
a gas supply port disposed in the release region;
a gas sniffer disposed in the detection region, the gas sniffer configured to detect gas released from the gas supply port when a defect in the membrane allows transfer of the gas from the release region to the detection region, where:
optionally, the gas includes helium gas;
optionally, the membrane includes a membrane for electrolysis, e.g., proton exchange membrane water electrolysis (PEMWE) or other electrolysis scheme.
2. A system including:
a chamber with a release region and a detection region;
a product holder positioned to hold a product to separate the release region and detection region;
a gas supply port disposed in the release region;
a gas sniffer disposed in the detection region, the gas sniffer configured to detect gas released from the gas supply port when a defect in the product allows transfer of the gas from the release region to the detection region, where:
optionally, the gas includes helium gas;
optionally, the product includes:
a membrane for electrolysis, e.g., proton exchange membrane water electrolysis (PEMWE) or other electrolysis scheme;
a membrane electrode assembly;

TABLE 1-continued

Examples a membrane cell assembly;
a stack of one or more membrane cells; or
any combination of the foregoing.
3. A method including:
placing a product to divide a chamber into a detection region and a release region;
releasing a gas in the release region;
operating a sniffer for the gas in the detection region to determine whether the product includes a defect that allows transfer of the gas from the release region to the detection region, where:
optionally, the gas includes helium gas;
optionally, the product includes:
a membrane for electrolysis, e.g., proton exchange membrane water electrolysis (PEMWE) or other electrolysis scheme;
a membrane electrode assembly;
a membrane cell assembly;
a stack of one or more membrane cells;
or any combination of the foregoing.
4. The system or method of any of the other examples in this table, further including multiple gas sniffers allowing determination of an approximate position of the defect, where:
optionally, the gas sniffers are positioned in an ordered array allowing determination of a coordinate position as the approximate position;
optionally, performing triangulation (or other multi-point position determination) based on signals at multiple different gas sniffers to determine the approximate position; and
optionally, determining the approximate position to be the position of a gas sniffer with the strongest signal.
5. The system or method of any of the other examples in this table, where the holder is supplied with the product and/or membrane via a feed, where:
optionally, the feed includes a piecewise feed;
optionally, the feed includes a continuous feed;
optionally, the feed includes a roll feed; and
optionally, the feed includes a robotic arm or other robotic device for placing the product in the holder.
6. The system or method of any of the other examples in this table, further including a gas removal port to support cycling of gas in conjunction with the gas supply port.
7. The system or method of any of the other examples in this table, further including performing a quality check by determining if the product has a defect, where:
optionally, the quality check is a pre-assembly quality check on a component such as a membrane, membrane electrode assembly, and/or cell assembly; and
optionally, the quality check is a post-assembly quality check on an assembled stack.
8. The system or method of any of the other examples in this table, where the defect includes:
optionally, a crack or fissure;
optionally, a hole (e.g., a pinhole);
optionally, a thinned region; and
optionally, virtually any deviation from design that allows increased gas transfer relative to design specifications.
9. The system or method of any of the other examples in this table, where the regions are held at a pressure differential with respect to one another, where:
optionally, the detection region is held at a lower pressure than the release region; and
optionally, the detection region is held at vacuum.
10. The system or method of any of the other examples in this table, where the sniffer is calibrated to detect a defect when a detection threshold is exceeded, where:
optionally, the system is calibrated to ignore a background level of gas that traverses the product to due defect-free product permeability.
11. A method including detecting defects by detecting gas transfer across a product defect, where:
optionally, the method is in accord with any other example in this table.
12. A system configured to detect defects by detecting gas transfer across a product defect, where:
optionally, the system is in accord with any other example in this table.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single implementation for the purpose of streamlining the disclosure. This disclosure is not to be interpreted as reflecting an intention that the claimed implementations require more features than are expressly recited in each claim. Rather, as the following claims reflect, inventive subject matter may be directed to less than all of the features of any of the disclosed implementations. Thus, the following claims are incorporated into the Detailed Description, with each claim standing on its own as defining separately claimed subject matter.

It is intended that the foregoing detailed description be regarded as illustrative rather than limiting and that it is understood that the following claims including all equivalents are within the scope of the disclosure. The claims should not be read as limited to the described order or elements unless stated to that effect. Therefore, all implementations that come within the scope and spirit of the following claims and equivalents thereto are included within the disclosure.

The invention claimed is:

1. A system comprising:
a chamber with a release region and a detection region;
a membrane holder positioned to hold an electrolysis membrane to separate the release region and detection region;
a gas supply port disposed in the release region;
multiple gas sniffers disposed in the detection region,
wherein each gas sniffer of the multiple gas sniffers is configured to detect gas released from the gas supply port when a defect in the electrolysis membrane allows transfer of the gas from the release region to the detection region, and
wherein the multiple gas sniffers are configured to determine a position of the defect in the electrolysis membrane based on signals received from different gas sniffers of the multiple gas sniffers; and
processing circuitry configured to perform triangulation based on the signals received from the different gas sniffers of the multiple gas sniffers to determine the position of the defect.

2. The system of claim 1, wherein the multiple gas sniffers are positioned in an ordered array allowing determination of a coordinate position as the position of the defect.

3. The system of claim 1, wherein the membrane holder is configured to receive the electrolysis membrane via an automated feed.

4. The system of claim 3, wherein the automated feed comprises a piecewise feed, a roll feed, a continuous feed, a robotic arm, or a combination thereof.

5. The system of claim 1, further comprising:
a gas removal port configured to support cycling of the gas in conjunction with the gas supply port.

6. The system of claim 1, wherein the defect comprises a crack or fissure, a hole, a thinned region, or a combination thereof.

7. The system of claim 1, wherein the detection region and the release region are configured to be held at a pressure differential with respect to one another.

8. The system of claim 7, wherein the detection region is configured to be held at a lower pressure than the release region.

9. The system of claim 1, where the electrolysis membrane comprises a proton exchange membrane water electrolysis (PEMWE) membrane.

10. The system of claim 1, wherein each gas sniffer of the multiple gas sniffers is calibrated to detect the defect when a gas detection threshold level is exceeded.

11. The system of claim 10, wherein the gas detection threshold level is selected to be greater than a background level associated with gas that traverses the electrolysis membrane due to defect-free membrane permeability.

12. A method comprising:
placing an electrolysis membrane to divide a chamber into a detection region and a release region;
releasing a gas in the release region;
operating multiple gas sniffers for the gas in the detection region to determine whether the electrolysis membrane comprises a defect that allows transfer of the gas from the release region to the detection region; and
determining a position of the defect using the multiple gas sniffers based on signals received from different gas sniffers of the multiple gas sniffers by processing circuitry performing a triangulation based on the signals received from the different gas sniffers of the multiple gas sniffers to determine the position of the defect.

13. The method of claim 12, wherein the operating of the multiple gas sniffers for the gas in the detection region to determine whether the electrolysis membrane includes the defect includes performing a quality check on the electrolysis membrane.

14. The method of claim 12, wherein the defect comprises a crack or fissure, a hole, a thinned region, or a combination thereof.

15. The method of claim 12, further comprising:
holding the detection region and the release region at a pressure differential with respect to one another.

16. The method of claim 12, wherein the electrolysis membrane comprises a proton exchange membrane water electrolysis (PEMWE) membrane.

17. A system comprising:
a chamber with a release region and a detection region;
an assembly holder positioned to hold a membrane cell assembly to separate the release region and detection region;
a gas supply port disposed in the release region;
multiple gas sniffers disposed in the detection region,
wherein each gas sniffer of the multiple gas sniffers is configured to detect gas released from the gas supply port when a defect in the membrane cell assembly allows transfer of the gas from the release region to the detection region, and
wherein the multiple gas sniffers are configured to determine a position of the defect in the membrane cell assembly based on signals received from different gas sniffers of the multiple gas sniffers; and
processing circuitry configured to perform triangulation based on the signals received from the different gas sniffers of the multiple gas sniffers to determine the position of the defect.

* * * * *